United States Patent [19]
Heo et al.

[11] Patent Number: 5,825,990
[45] Date of Patent: Oct. 20, 1998

[54] ERROR REPORTING METHOD FOR FACSIMILE SYSTEM

[75] Inventors: Man-Yeong Heo; Byung-Sun Ahn, both of Suwon, Rep. of Korea

[73] Assignee: SamSung Electronics Co., Ltd., Kyungki-do, Rep. of Korea

[21] Appl. No.: 751,702

[22] Filed: Nov. 18, 1996

[30] Foreign Application Priority Data

Nov. 16, 1995 [KR] Rep. of Korea .................. 1995-41670

[51] Int. Cl.⁶ ............................................ H04N 1/32
[52] U.S. Cl. .................... 395/113; 358/437; 358/442; 358/444
[58] Field of Search ........................... 358/400, 434–440, 358/442, 444, 468; 395/113–116; 399/85–87; 379/93.09, 100.16; H04N 1/32

[56] References Cited

U.S. PATENT DOCUMENTS

| | | |
|---|---|---|
| 4,224,641 | 9/1980 | Kanda . |
| 4,970,599 | 11/1990 | Nobuta . |
| 5,127,047 | 6/1992 | Bell et al. . |
| 5,134,501 | 7/1992 | Satomi et al. . |
| 5,140,439 | 8/1992 | Tanaka . |
| 5,333,062 | 7/1994 | Hara et al. ............................... 358/439 |
| 5,335,085 | 8/1994 | Nakatsuma . |
| 5,357,562 | 10/1994 | Metser et al. ........................... 358/442 |
| 5,446,557 | 8/1995 | Haze ....................................... 358/444 |

*Primary Examiner*—Kim Yen Vu
*Attorney, Agent, or Firm*—Robert E. Bushnell, Esq.

[57] ABSTRACT

Method of audibly reporting an error state of a receiving facsimile system to inform a transmitting party of such an error state and to inform a service station of the error state through a remote error receiving function for maintenance services. The facsimile system includes a voice data storing unit for storing voice data for an error message of the facsimile system; a voice synthesizer for synthesizing voice data after selecting voice data stored in the voice data storing unit under control of a central processing unit; and a switch connected with the facsimile system and the voice synthesizer, for switching a voice error message signal, and outputting one between the voice error message of the voice synthesizer and the facsimile data of the facsimile system through a public switched telephone network, under control of a central processing unit.

16 Claims, 3 Drawing Sheets

ERROR REPORTING METHOD FOR FACSIMILE SYSTEM

CLAIM FOR PRIORITY

This application makes reference to, incorporates the same herein, and claims all benefits accruing under 35 U.S.C. §119 from an application for *Error Reporting Method And Apparatus For Facsimile System* earlier filed in the Korean Industrial Property Office on 16 Nov. 1996 and there duly assigned Ser. No. 41670/1995.

BACKGROUND OF THE INVENTION

1. Technical Field

This invention relates to a method and apparatus of warning of an occurrence of a malfunction in a facsimile system, and more specifically, to a method and apparatus of issuing a vocal warning of an error state in the facsimile system to a transmitting facsimile system.

2. Background Art

Conventional facsimile systems available in the market today contain a long list of sophisticated options for the convenience of users. One of those convenient features is to record data relating to all documents that had been sent or received by the facsimile system in a list stored in a memory so that the user can print the list of documents on a sheet of paper in order to access to data stored in the memory. Typically, the list contains the transaction or communication number, how each document was stored, the telephone number for the originating connection, the number of pages of the document, the date and time each document was stored in the fax memory and when it will be sent, the sender's name and any communication errors that occurred while sending the document.

As facsimile systems become increasingly accessible for use by a multitude of people with different calling functions, it is important to report an abnormality or error in image data relating to all documents that had been received by the facsimile system so that retransmission of image data may be obtained. Conventional facsimile systems generally report communication errors by way of an error report to inform the user of such errors as disclosed, for example, in U.S. Pat. No. 4,224,641 for *Abnormality Indication System Of Facsimile Apparatus* issued to Kanda, U.S. Pat. No. 5,134,501 for *Facsimile Apparatus* issued to Satomi et al., or by way of a visual display as disclosed, for example, in U.S. Pat. No. 5,335,085 for *Facsimile Apparatus* issued to Nakatsuma. When an error occurs in a facsimile system, neither document transmission or reception is possible. Consequently, if a transmitting subscriber transmits the document normally via a transmitting facsimile system, a receiving subscriber cannot receive the document if the receiving facsimile system is experiencing an error in its mode of operation. We have noticed that when the receiving facsimile system is in error, there is no way for the transmitting subscriber to be certain whether the receiving subscriber receives the document or even that some, or all of the pages of the document have been received.

One conventional technique to notify the transmitting subscriber of the status of a transmitted facsimile message is disclosed, for example, in U.S. Pat. No. 5,127,047 for *Facsimile Machine Having User Notification Capability* issued to Bell et al., in which a prerecorded voice message is transmitted to the transmitting subscriber after a preprogrammed telephone number contained in a list of parties to be notified that is stored as a table in an internal memory is dialed to inform the transmitting subscriber that a transmission error or other types of error or equipment malfunction has occurred. We have noticed that in Bell '047, however, if no telephone number exists in the table stored in the internal memory, then no one is notified regardless of whether a transmission error or equipment malfunction has occurred. Moreover, a notify feature button on an operating panel of the facsimile system must be activated by the user before the notify feature can be processed.

Another conventional effort to notify the transmitting subscriber of the status of his or her transmitted facsimile message is attempted, for example, in U.S. Pat. No. 5,140,439 for *Facsimile Communication Method And Facsimile Machine* issued to Tanaka, in which another type of prerecorded voice message is supposed to be transmitted to the transmitting subscriber to announce successful completion of facsimile communication or to request retransmission of facsimile message if a transmission error has occurred and the transmission error exceeds a predetermined level of error tolerance. We have found that while Tanaka '439 does not require a preprogrammed telephone number of the transmitting subscriber, the type of errors detected are limited to facsimile transmission errors. Consequently, if the receiving facsimile system suffers system errors or other predefined types of conditions associated with an incomplete reception of a document by the receiving facsimile system such as, "out-of-paper", "printer malfunction", "cover open", "paper jam", etc. . . . , there is still no cost effective and complete way to inform the transmitting subscriber of either the occurrence of an error or of the status of the receiving facsimile system.

SUMMARY OF THE INVENTION

Accordingly, it is therefore an object of the present invention to provide an improved facsimile system and process.

It is also an object to provide an improved facsimile system for vocally informing a transmitting subscriber from a transmitting facsimile system of its malfunction status.

It is another object to provide an improved facsimile system and a process of audibly reporting an error state of a receiving facsimile system to a transmitting facsimile system to inform a transmitting subscriber of a predefined type of equipment malfunctions associated with the receiving facsimile system.

It is yet another object to provide an improved facsimile system and a process of audibly reporting a system error state of a receiving facsimile system to a service station in order to alert a service person of such a system error for facsimile services.

These and other objects of the present invention can be achieved by a facsimile system which includes a memory for storing a plurality of voice messages each representing a different type of malfunctions of the facsimile system; a controller for determining different types of malfunctions of the facsimile system; a voice message generator for generating a voice message corresponding to a specific type of malfunctions of the facsimile system determined by the controller; and a facsimile processor for receiving facsimile data from a telephone line for printing on a printable medium. A switch connected to the telephone line, is operable in either an error message transmission mode for permitting transmission of the voice message to a transmitting facsimile system and a facsimile data reception mode for permitting reception of facsimile data normally from the transmitting facsimile system when the facsimile data is received from the telephone line and the specific type of malfunction of the facsimile system is determined by the controller.

An error reporting process of a receiving facsimile system can be achieved by determining whether a transmission attempt tone from a transmitting facsimile system is received from a telephone line, and switching to a normal facsimile reception mode to print facsimile data received from the telephone line when the receiving facsimile system is in a normal state. Alternatively, the receiving facsimile system is switched to an error message reception mode to transmit a voice message corresponding to the specific type of malfunction being experienced by the receiving facsimile system to the transmitting facsimile system when the receiving facsimile system is in an error state; and the error state of the receiving facsimile system is reported to the transmitting facsimile system via the telephone line by way of the voice message.

The present invention is more specifically described in the following paragraphs by reference the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
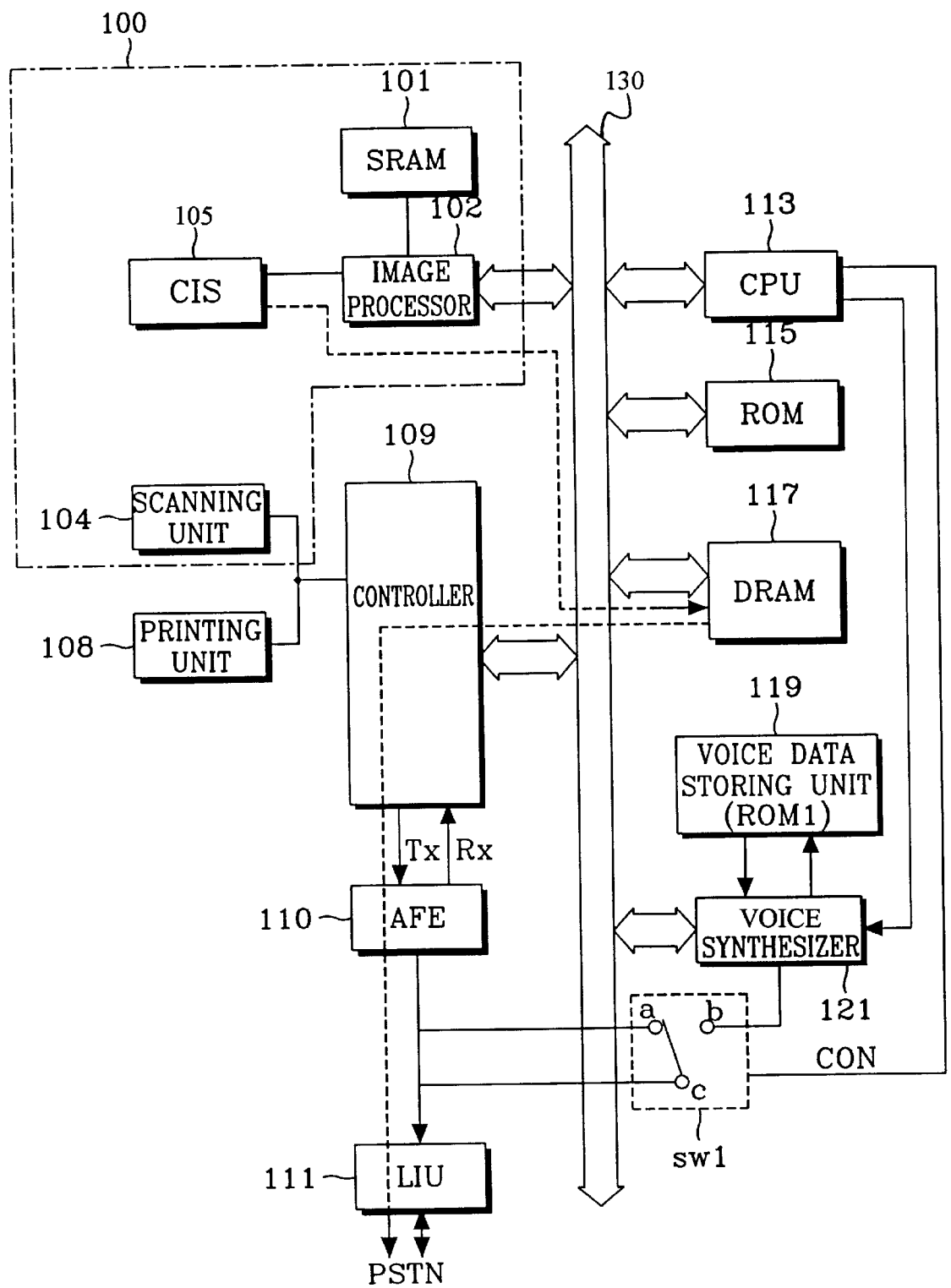
FIG. 1 is a block diagram illustrating a facsimile system constructed according to the principles of the present invention.

Referring now to the drawings and particularly to FIG. 1, which illustrates a facsimile system constructed according to the principles of the present invention. The facsimile system includes an image input unit 100, a printing unit 118, a facsimile controller 109 for controlling the reading and printing of facsimile data received from a private switch telephone network (PSTN) via a line interface unit (LIU) 111 and an analog front end (AFE) 110, a control processing unit (CPU) 113 for controlling an audible error reporting operation of the facsimile system while audibly reporting occurrence of errors, a read-only-memory (ROM) 115, a dynamic random-access-memory 117, a voice data storing unit 119, and a voice synthesizer 121, all of which are connected to a bus 130.

Voice data storage unit 119 stores a plurality of voice data for a voice error message each for informing a specific type of system errors or other predefined types of equipment malfunctions typically associated with the receiving facsimile system such as, "out-of-paper", "printer malfunction", "XXX part is out-of-order", "cover open" or "paper jam". A voice data recording unit is preferred for allowing a user to store voice data in the voice data storing unit 119. A voice synthesizer 121 synthesizes voice data after selecting the voice data stored in the voice data storing unit 119 according to a control signal of the central processing unit 113. A switch SW1 is connected with the facsimile system and the voice synthesizer 121, and is operable in either an error message transmission mode for permitting transmission of an error voice message to a transmitting facsimile system or a facsimile data reception mode for normally receiving facsimile data from a transmitting facsimile system under the control of the central processing unit 113. That is, switch SW1 operationally toggles between functional connections with the output of the voice synthesizer 121 and the output of the facsimile system after selecting one of them through the private switch telephone network in response to reception of a control signal end CON generated from the central processing unit 113.

Image input unit 100 includes a contact image sensor (CIS) 103 for converting an image of the document to be transmitted into image data, an image processor 102, a static random-access-memory (SRAM) 101, and a scanning unit 104. A facsimile controller 109 controls the overall operation facsimile system. A printing unit 108 outputs received data, print data, and status data. The central processing unit 113 determines a specific type of equipment malfunctions associated with the receiving facsimile system such as, "out-of-paper", "printer malfunction", "XXX part is out-of-order", "cover open" or "paper jam", accesses the voice data storage unit 119 to output corresponding voice data, and controls the voice synthesizer 121 to synthesize the voice data into a voice error message for transmission to a transmitting facsimile system. The central processing unit 113 also controls operation of the read-only-memory (ROM) 115 which stores basic programs for operation of the facsimile system and the dynamic random-access-memory (DRAM) 117 which serves as a working area for storing temporary data.

Figure 2:
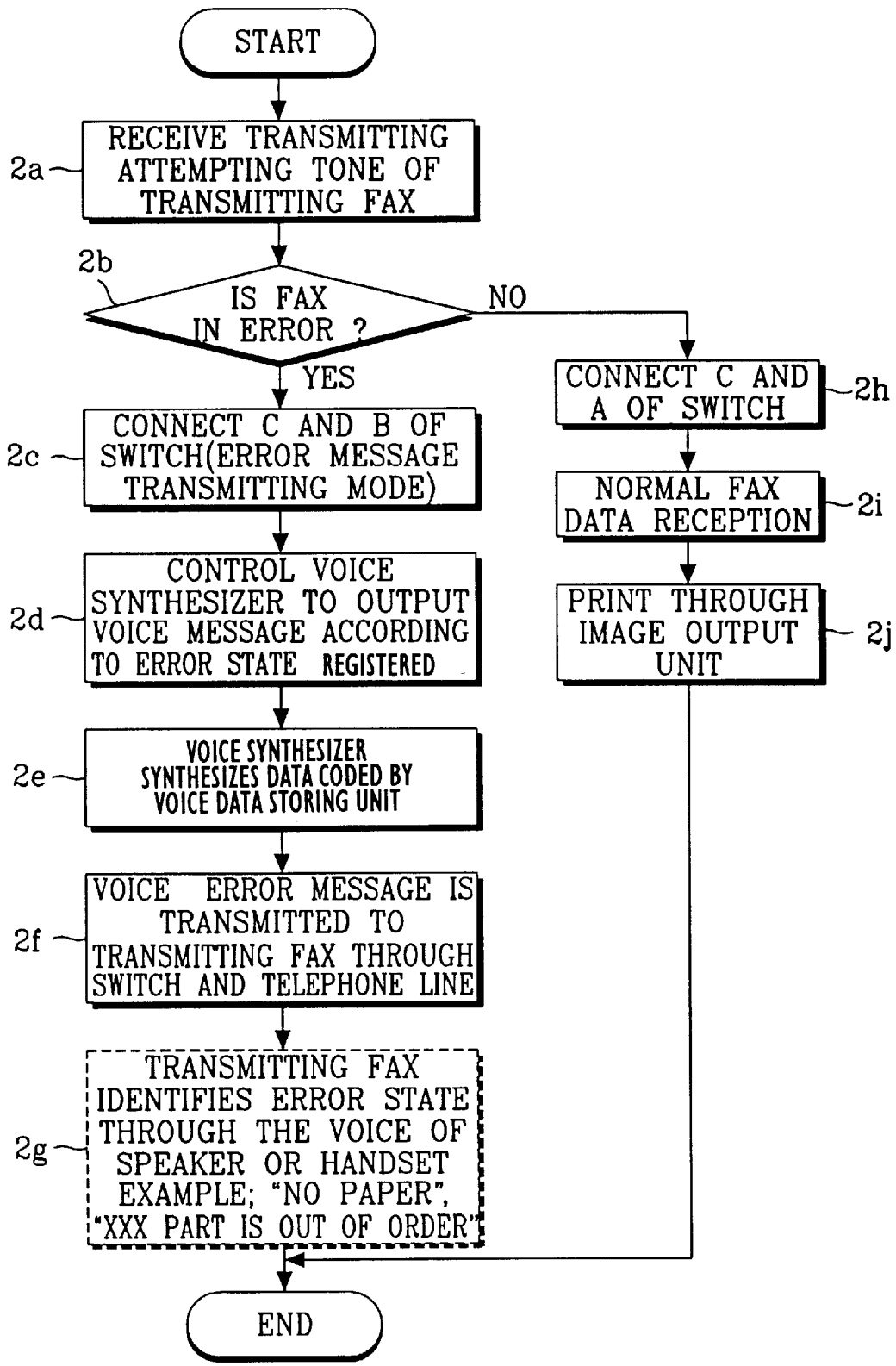
FIG. 2 is a flow chart illustrating a process of audibly reporting an error state of a receiving facsimile system to a transmitting facsimile system in accordance with the practice of a preferred embodiment of the present invention.

Turning now to FIG. 2 which illustrates a process of audibly reporting an error state of a receiving facsimile system to a transmitting facsimile system according to the practice of a preferred embodiment of the present invention. As shown in FIG. 2, the voice error reporting process includes the steps of checking an error state of a receiving facsimile system after receiving a transmission attempting tone from a transmitting facsimile system; printing image data through an image output unit after switching on a normal facsimile transmission function and receiving image data when the receiving facsimile system is in a normal state; accessing a voice error message stored in voice data storing unit corresponding to the type of error state of the receiving facsimile system after switching to an error message transmitting mode when the receiving facsimile system is in error; and reporting the error state of the receiving facsimile system to the transmitting facsimile system by transmitting the voice error message which the voice synthesizer generates by synthesizing the voice data corresponding to the error message through the private switch telephone network.

Figure 3:
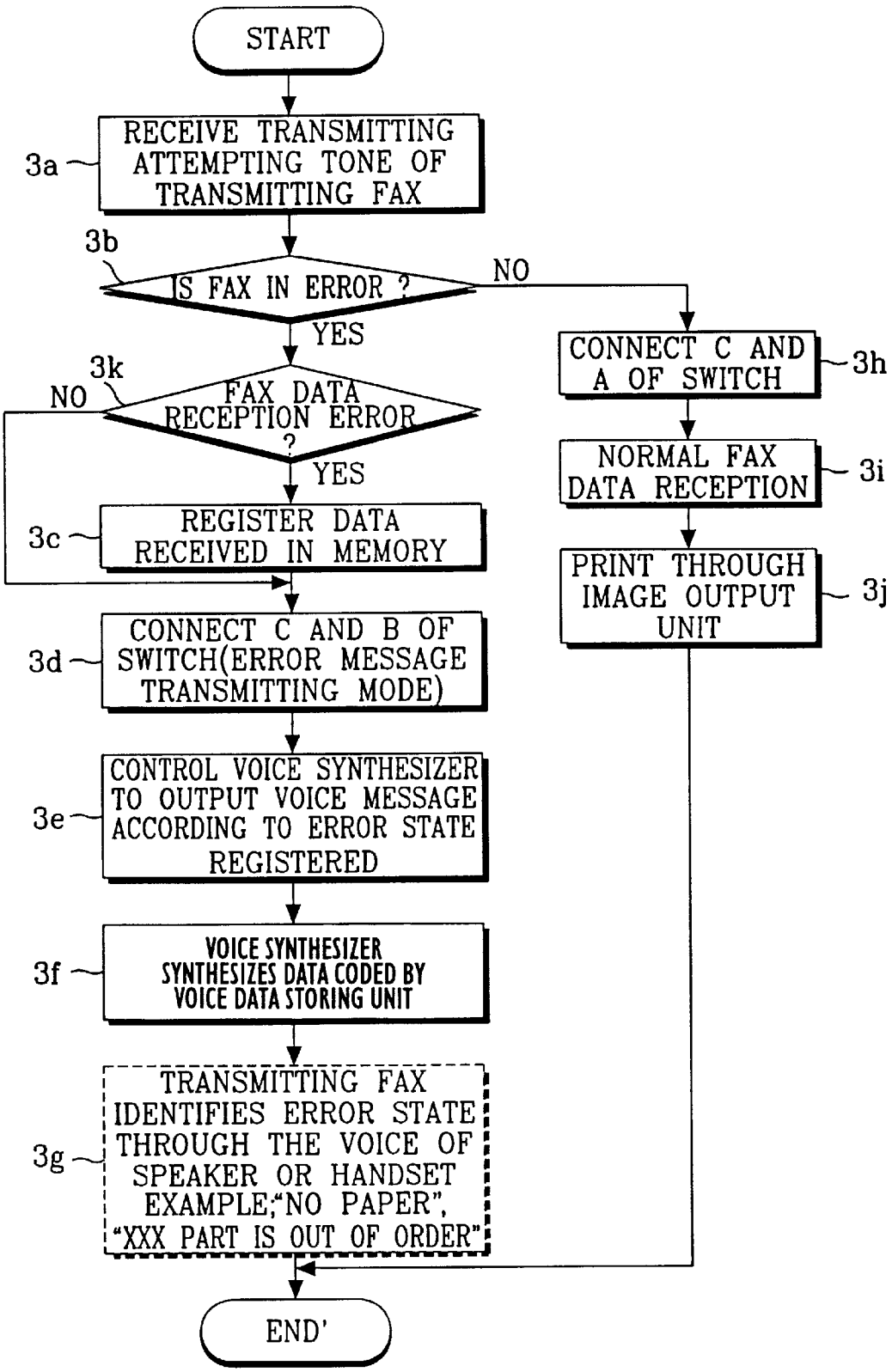
FIG. 3 is a flow chart illustrating a process of audibly reporting an error state of a receiving facsimile system to a transmitting facsimile system in accordance with the practice of another preferred embodiment of the present invention.

FIG. 3 illustrates a process of audibly reporting an error state of a receiving facsimile system to a transmitting facsimile system according to another preferred embodiment of the present invention. As shown in FIG. 3, the voice error reporting process includes the steps of checking an error state of a receiving facsimile system after receiving a transmission attempting tone from a transmitting facsimile system; checking whether an error during the reception of data has occurred while the receiving facsimile system is in a normal state; storing image data received when there is error experienced during the reception of image data; printing the image data through an image output unit after switching to a normal FAX function and receiving the image data when the receiving facsimile system is in a normal state without data reception error; accessing the voice error message stored in voice data storing unit corresponding to the type of an error state of the receiving facsimile system after switching to an error message transmitting mode when there is no data reception error in the facsimile system, or when the image data received is registered in a dynamic random access memory after occurrence of data system error; and reporting the error state of the receiving facsimile system to the transmitting facsimile system by transmitting the voice error message which the voice synthesizer generates by synthesizing the voice data corresponding to the error message through the private switch telephone network.

With reference to FIGS. 1 to 3, the preferred embodiments of the present invention will be described below in detail.

As shown in FIG. 2, the controller 109 first receives a transmission attempting tone from a transmitting facsimile system through line interface unit 111 and analog front end 110 at step 2a. The controller 109 sends tone data to the central processing unit 113. The central processing unit 113 decides whether a facsimile reception can be performed normally in the facsimile system after checking an error state of the facsimile system at step 2b. When the facsimile system is in error at step 2b, that is, when the receiving facsimile system experiences an equipment malfunction such as, "out-of-paper", "printer malfunction", "XXX part is out-of-order", "cover open" or "paper jam", the central processing unit 113 generates a control end signal CON to the switch SW1 to connect a telephone line terminal c linked to the line interface unit 111 to a voice terminal b so as to allow transmission of a voice error message corresponding to the type of an error state experienced by the receiving facsimile system to the transmitting facsimile system at step 2c. The voice synthesizer 121 is then controlled to output a proper voice error message that is representative of the particular error such as "No paper", for transmission to the transmitting facsimile system at step 2d. The voice synthesizer 121 synthesizes the voice data after receiving necessary data relevant to voice information from the voice data storing unit 119 at step 2e. The voice error message such as "Error state", "Reception is unavailable", or "XXX part is out of order" when the receiving facsimile system experiences equipment malfunction is transmitted to the transmitting facsimile system through the switch SW1 and telephone line at step 2f. "No paper" voice error message is transmitted to the transmitting facsimile system when the receiving facsimile system is out-of-paper.

When the receiving facsimile system experiences equipment malfunctions as described, a voice error message corresponding to such an equipment malfunction is also sent to a service station for maintenance services using a preprogramed telephone number of the service station after such a voice error message is transmitted to a transmitting facsimile system to inform a transmitting subscriber an error state of the receiving facsimile system.

Referring now to FIG. 3 which illustrates salient features of another embodiment of the present invention, the controller 109 first receives a transmission attempting tone from a transmitting facsimile system through line interface unit 111 and analog front end 110 at step 3a. The controller 109 sends a tone signal to the central processing unit 113. The central processing unit 113 decides whether the reception can be performed normally in the facsimile system after checking the error state of the facsimile system at step 3b. When the receiving facsimile system is in error, the central processing unit 113 checks the data reception error of the receiving facsimile system at step 3k. In case of the reception error of the facsimile system at step 3k, the image data received is stored in DRAM 117 at step 3l. If there is no error during reception at step 3k or if the recording of the image data received is completed at step 3l, steps 3c to 3g will be performed. The control end signal CON of the switch SW1 is controlled to connect the telephone line terminal c linked to the line interface unit 111 and the voice terminal b so as to transmit the voice error message to the transmitting facsimile system at step 3c.

The voice synthesizer 121 is controlled to output a proper message voice such as "No paper" for transmission to the transmitting facsimile system at step 3d. The voice synthesizer 121 synthesizes the voice data after receiving necessary data relevant to voice information from the voice data storing unit 119 at step 3e. The voice message is transmitted to the transmitting facsimile system through switch SW1 and telephone line at step 3f.

If the facsimile system is not in an error state, the facsimile system is normal by connecting terminal c to terminal a of the switch SW1 and perform printing operation through the image output unit.

As described above, since a transmitting subscriber of a transmitting facsimile system is informed of an error state of a receiving facsimile system by way of a voice error message through the speaker or handset, the subscriber has more options in terms of either stopping sending documents to the receiving facsimile system or sending the documents to another facsimile system. As a result, the cost of sending facsimile messages can be minimized. In addition, if all facsimile systems are equipped with an embodiment of the voice error reporting process of the present invention, the service station can be aware of the system error at an early stage, so that an early repair may be possible.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the appended claims.

What is claimed is:

1. A facsimile system, comprising:

a memory for storing a plurality of voice messages each representing a different type of malfunction of said facsimile system;

control means for determining different types of malfunction occurring during operation of said facsimile system;

a voice message generator for generating a voice message corresponding to a specific type of malfunction determined;

communication means for transmitting and receiving facsimile data to and from a telephone line for subsequent printing onto a printable medium; and switch means connected to said telephone line, and operable in one of an error message transmission mode for permitting automatic transmission of said voice message to a transmitting facsimile system via said telephone line to inform said transmitting facsimile system of said specific type of malfunction in dependence upon determination by said control means of an occurrence of said specific type of malfunction, and operable in a facsimile data reception mode for permitting reception of facsimile data from said transmitting facsimile system in dependence upon reception of said facsimile data from said transmitting facsimile system and determination by said control means of one of an absence of malfunction by said facsimile system and an occurrence of said specific type of malfunction by said facsimile system.

2. The facsimile system of claim 1, further comprised of said voice message generator including a voice synthesizer converting binary information into a plurality of different voice messages each corresponding to a specific type of malfunction.

3. The facsimile system of claim 1, further comprised of said transmitting facsimile system including an attached telephone accommodating verbal communications via the telephone line.

4. The facsimile system of claim 1, further comprised of said specific type of malfunction of said facsimile system representing one of a "out-of-paper" message, a "printer malfunction" message, a "XXX part is out-of-order" message, a "cover open" message and a "paper jam" message.

5. The facsimile system of claim 1, further comprising a scanner for scanning a document and generating image data for transmission via said telephone line.

6. An error reporting method in a receiving facsimile system, comprising the steps of:
   determining whether a transmission attempt tone from a transmitting facsimile system is received from a telephone line;
   switching to a normal facsimile reception mode to print facsimile data received from said telephone line when said receiving facsimile system is in a normal state;
   alternatively, switching to an error message transmission mode to automatically transmit a voice message corresponding a specific type of malfunction of said receiving facsimile system to said transmitting facsimile system via said telephone line to inform said transmitting facsimile system of said specific type of malfunction, when said receiving facsimile system is in an error state; and
   enabling reporting the error state of said receiving facsimile system at said transmitting facsimile system via said telephone line by way of said voice message.

7. The method of claim 6, further comprising the steps of:
   determining whether said facsimile data received from said telephone line contains errors when said facsimile system is in said normal state; and
   recording said facsimile data received from said telephone line containing errors prior to switching to said error message transmission mode.

8. The method of claim 6, further comprised of said specific type of malfunction of said facsimile system representing one of a "out-of-paper" message, a "printer malfunction" message, a "XXX part is out-of-order" message, a "cover open" message and a "paper jam" message.

9. A facsimile system, comprising:
   a memory for storing therein a plurality of voice messages each representing a specific type of system errors associated to said facsimile system;
   switch means connected to a telephone line, and operable in one of an error report transmission mode for enabling said facsimile system to transmit a voice message from said plurality of voice messages stored in said memory corresponding an error experienced by said facsimile system to a transmitting facsimile system via said telephone line, and a normal facsimile reception mode for enabling said facsimile system to receive a facsimile message from said transmitting facsimile system via said telephone line; and
   control means for controlling operation of said facsimile system in one of said error report transmission mode and said normal facsimile reception mode in response to reception of said facsimile message from said transmitting facsimile system via said telephone line.

10. The facsimile system of claim 9, further comprising a scanner for scanning a document and outputting image data for transmission via said telephone line.

11. The facsimile system of claim 9, further comprised of said transmitting facsimile system including an attached telephone.

12. The facsimile system of claim 8, further comprised of said specific type of malfunction of said facsimile system representing one of a "out-of-paper" message, a "printer malfunction" message, a "XXX part is out-of-order" message, a "cover open" message and a "paper jam" message.

13. The facsimile system of claim 9, further comprising a voice message generator for generating said voice message corresponding to a specific type of malfunction of said facsimile system determined by said control means.

14. The facsimile system of claim 13, further comprised of said voice message generator including a voice synthesizer.

15. A method for reporting an error in a facsimile system, comprising the steps of:
   determining whether a transmission attempt tone from a transmitting facsimile system is received from a telephone line;
   when the transmission attempt tone is received from said telephone line, determining whether said facsimile system experiences any type of malfunction;
   when said facsimile system does not experience any type of malfunction, switching to a normal facsimile reception mode to print facsimile data received from said transmitting facsimile system via said telephone line;
   alternatively, when said facsimile system experiences malfunction, determining whether said facsimile data received from said transmitting facsimile system via said telephone line contains an error;
   when said facsimile data received from said transmitting facsimile system via said telephone line contains said error, registering said facsimile data in a memory and then switching to an error message transmission mode to transmit a voice message corresponding a specific type of malfunction of said receiving facsimile system to said transmitting facsimile system via said telephone line;
   when said facsimile data received from said transmitting facsimile system via said telephone line does not contain said error, switching to said error message transmission mode to transmit said voice message corresponding said specific type of malfunction of said receiving facsimile system to said transmitting facsimile system via said telephone line; and
   enabling reporting the error state of said receiving facsimile system at said transmitting facsimile system via said telephone line by way of said voice message.

16. The method of claim 15, further comprised of said specific type of malfunction of said facsimile system representing one of a "out-of-paper" message, a "printer malfunction" message, a "XXX part is out-of-order" message, a "cover open" message and a "paper jam" message.

* * * * *